(12) United States Patent
Myerscough et al.

(10) Patent No.: US 11,828,378 B2
(45) Date of Patent: Nov. 28, 2023

(54) VALVE CAP

(71) Applicant: OCEAN RODEO SPORTS INC., Victoria (CA)

(72) Inventors: Richard Myerscough, Victoria (CA); Liam McLean, Victoria (CA)

( * ) Notice: Subject to any disclaimer, the term of this patent is extended or adjusted under 35 U.S.C. 154(b) by 0 days.

(21) Appl. No.: 17/976,490

(22) Filed: Oct. 28, 2022

(65) Prior Publication Data

US 2023/0134646 A1 May 4, 2023

Related U.S. Application Data

(60) Provisional application No. 63/274,805, filed on Nov. 2, 2021.

(51) Int. Cl.
*F16K 27/08* (2006.01)
*F16K 15/20* (2006.01)

(52) U.S. Cl.
CPC ............ *F16K 27/08* (2013.01); *F16K 15/205* (2013.01)

(58) Field of Classification Search
CPC .. F16K 27/08; F16K 15/205; Y10T 137/3584; Y10T 137/374; B60C 29/066; B63C 9/24; B65D 41/36; B65D 41/04; B65D 41/0421
USPC ................. 137/223, 232; 206/524.8; 441/41; 285/358–362; 220/300, 727
See application file for complete search history.

(56) References Cited

U.S. PATENT DOCUMENTS

| | | | | |
|---|---|---|---|---|
| 2,736,333 A | * | 2/1956 | Hancox | F16K 21/04 137/232 |
| 2,804,085 A | * | 8/1957 | Di Geamberdino | B63C 9/24 137/223 |
| 3,260,276 A | * | 7/1966 | Stasiunas | F16K 15/20 251/351 |
| 3,903,915 A | * | 9/1975 | Rosaz | F16K 15/20 137/232 |
| 4,281,422 A | * | 8/1981 | Simonelli | E04H 4/12 137/232 |
| 4,766,628 A | * | 8/1988 | Walker | A47C 27/082 137/232 |
| 5,871,031 A | * | 2/1999 | Greinacher | F16K 15/207 137/599.08 |
| 6,074,261 A | * | 6/2000 | Jougla | B63C 9/24 441/41 |
| 6,089,251 A | * | 7/2000 | Pestel | B63C 9/24 137/232 |
| 6,196,254 B1 | * | 3/2001 | Shaw | B60C 29/06 137/231 |

(Continued)

*Primary Examiner* — Craig J Price

(57) ABSTRACT

A valve assembly for mounting on a substrate via rotational engagement with a base of the valve assembly, and a cap for such a valve assembly. A body of the cap is rotatably engageable with the base between opposing first and second terminal ends. At each of the first and second terminal ends, the body and the base abut each other to prevent rotation between the body and the base. As a result, torque applied to the cap is transmitted to the base to vary rotational engagement of the base with the substrate. A slot formed in the cap may be suitable to receive a protrusion on the base and may fork into two separate portions that terminate in opposing terminal ends to allow selective engagement of the protrusion with the two portions. The protrusion abuts against the terminal ends to transmit torque from the cap to the base.

18 Claims, 4 Drawing Sheets

(56) References Cited

U.S. PATENT DOCUMENTS

| | | | | |
|---|---|---|---|---|
| 6,712,334 B2* | 3/2004 | Motonaka | ............ | A45C 7/0081 |
| | | | | 251/149.6 |
| 6,929,021 B2* | 8/2005 | Cavenagh | ............ | B65D 81/052 |
| | | | | 137/232 |
| 7,051,031 B2* | 5/2006 | Schein | ....................... | G06F 9/52 |
| | | | | 707/697 |
| 7,051,753 B1* | 5/2006 | Caires | .................. | B65D 47/243 |
| | | | | 137/232 |
| 7,410,145 B1* | 8/2008 | Elze | ....................... | B60P 7/065 |
| | | | | 251/83 |
| 7,438,081 B1* | 10/2008 | Chen | ..................... | F16K 15/207 |
| | | | | 137/493.2 |
| 8,235,632 B2* | 8/2012 | Keenan | .................. | B60P 7/065 |
| | | | | 410/119 |
| 8,397,958 B2* | 3/2013 | Smith | ................ | B65D 75/5877 |
| | | | | 222/105 |
| 9,719,541 B2* | 8/2017 | de Grasse | ........... | F16B 12/2009 |
| 10,228,067 B2* | 3/2019 | Miller | .................. | F16K 15/207 |
| 2003/0234040 A1* | 12/2003 | Cavenagh | .......... | B65D 51/1683 |
| | | | | 137/223 |
| 2012/0048392 A1* | 3/2012 | Song | ....................... | F16K 15/20 |
| | | | | 137/224 |
| 2016/0186875 A1* | 6/2016 | Pansegrouw | ......... | F16K 15/205 |
| | | | | 137/1 |
| 2017/0211713 A1* | 7/2017 | Miller | ................... | F16K 15/207 |

* cited by examiner

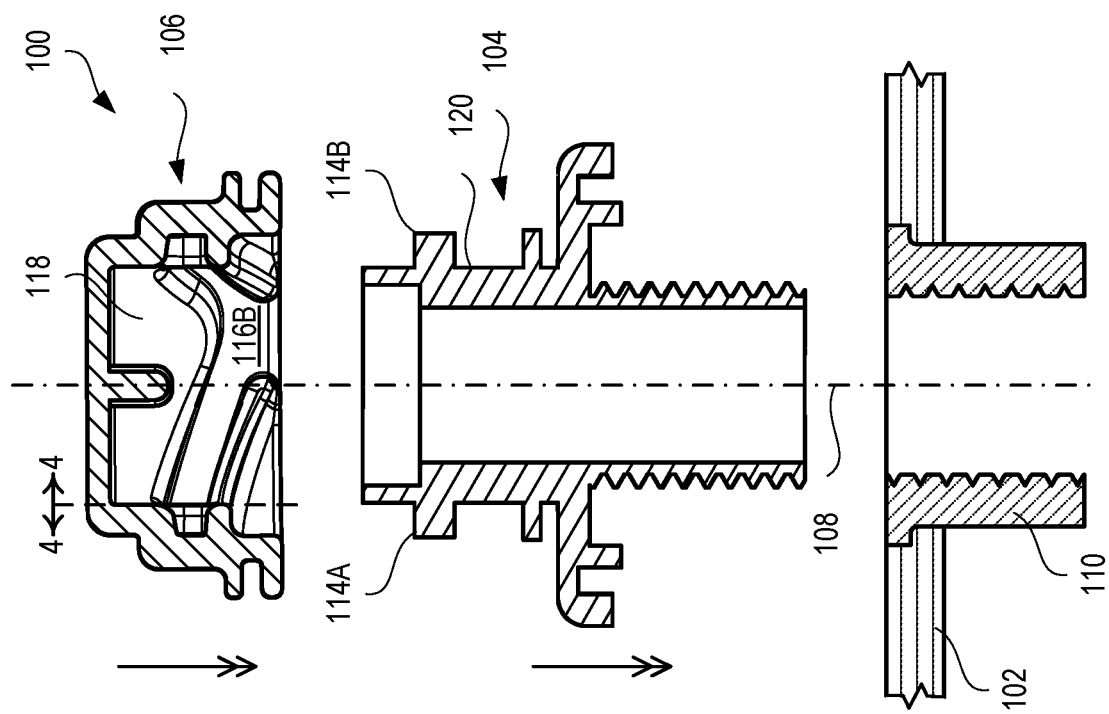
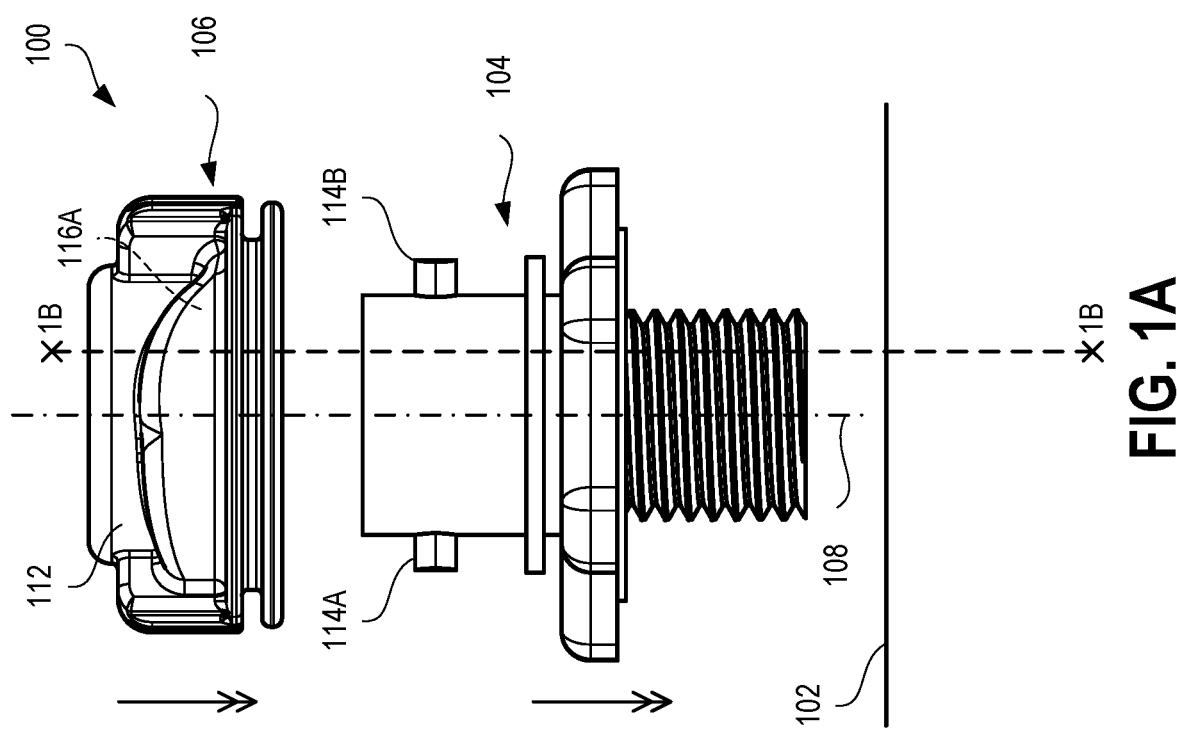

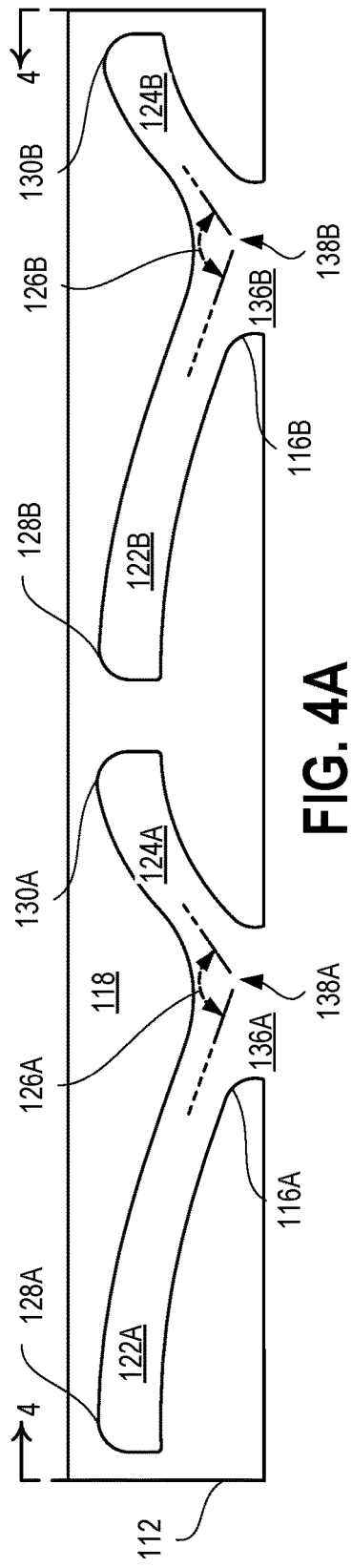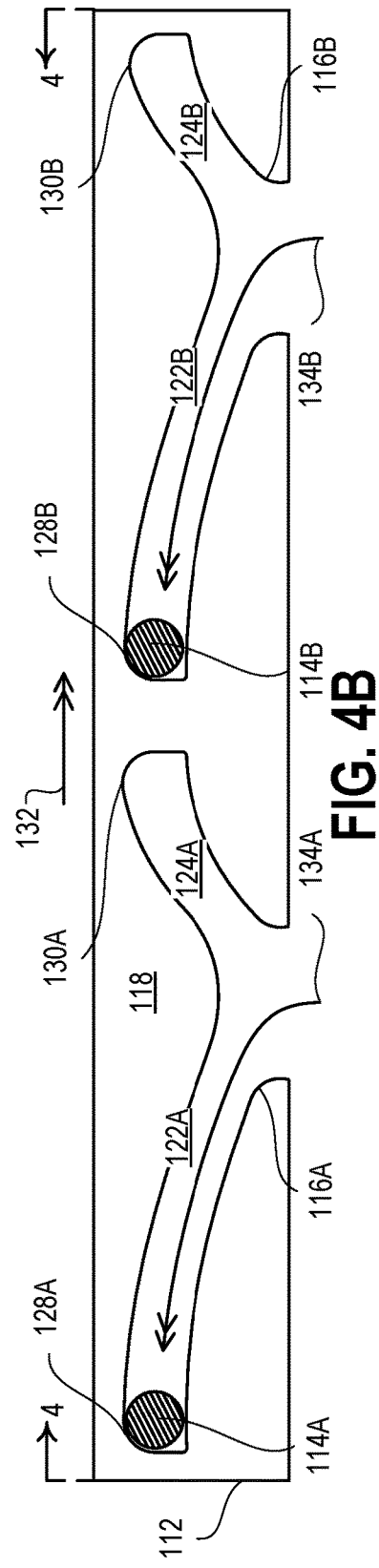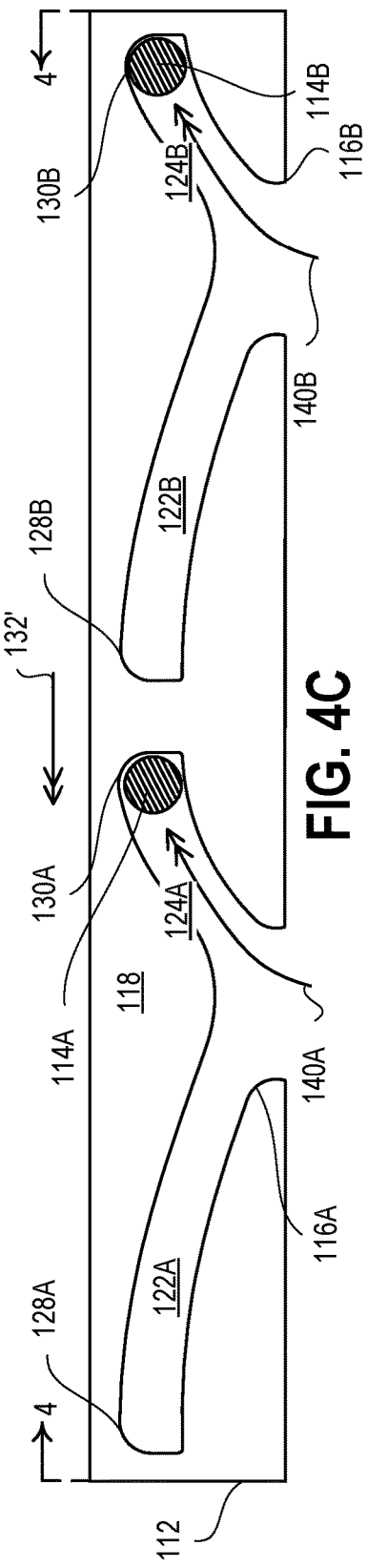

VALVE CAP

CROSS-REFERENCE TO RELATED APPLICATIONS

This application claims the benefit of U.S. Provisional Application No. 63/274,805 filed on Nov. 2, 2021.

TECHNICAL FIELD

The disclosure relates generally to valves for inflatables, and more particularly to caps for such valves.

BACKGROUND

Threaded inflate valves are commonly used on inflatable water sports equipment. For example, inflatable kites for kiteboarding or inflatable wings for wing surfing. This equipment is commonly composed of an outer airframe with an inflatable internal bladder(s) with an inflate valve. The inflate valve is composed of a valve coupler which is welded to the internal bladder, a valve base with a one way valve which threads into the valve base, and a valve cap, which adds an extra level of protection from debris, or air leaks. To inflate the equipment, the valve cap is removed, and a pump is attached to the valve base. To deflate the equipment, the valve base is unthreaded from the valve coupler, leaving an opening in the bladder for the air to escape.

A normal valve cap attaches to the valve base by the means of normal half-turn or quarter-turn threads. The valve cap threads on and locks into place on the valve base. When it is time to deflate the equipment the valve cap is removed, and then the user grabs a handle and rotates it to unthread the valve base from the valve coupler. In some cases, deflation in such a manner is difficult to achieve for a user. For example, at fully inflation, a membrane of an inflatable may be taut against a seat of the valve base, which then may make manipulation of the valve base and separation of the valve base from the membrane a challenging task.

SUMMARY

Valve caps are suitable for gripping by hand and are normally spaced apart from a substrate on which a base of the valve is mounted to make removal and mounting of the cap on the valve base easier. The disclosure describes valve caps that are used as handling features to mount and install a complementary valve base onto a substrate, e.g. installation via rotational engagement of the valve base with a coupler fused to a membrane of an inflatable. A larger grip surface of the valve body in comparison to the valve base may allow for greater torque and easier removal of the valve base from the substrate.

By causing abutment of a cap, rotationally engaged with a base, against the base in both opposing rotational directions, torque applied to the cap can be transmitted to the base to be used to effect engagement and disengagement of the base with the substrate.

For example, this may be achieved by a circumferential slot formed in the cap, complementary to a protrusion on the base, that forks in two opposing circumferential directions and thereby defines two opposing abutting surfaces; a resulting bidirectional rotational engagement of the protrusion in the slot allowing application of bidirectional torque onto the base, via torque applied at the two abutting surfaces, to selectively rotationally engage or disengage the base from the substrate.

In an aspect, the disclosure describes a valve assembly for mounting on a substrate. The valve assembly also includes a base rotatably engageable with the substrate; and a cap defining a body that is rotatably engageable with the base between opposing first and second terminal ends, the body and the base abutting each other, at each of the first and second terminal ends, so as to prevent rotation between the body and the base to allow torque applied to the cap to be transmitted to the base to vary rotational engagement of the base with the substrate.

Implementations may include one or more of the following features. The valve assembly the base is rotationally engageable with the substrate by a protrusion slidably engageable with a slot complementary to the protrusion for translation of the protrusion along an elongation of the slot. The slot is elongated between an open end and the first and second terminal ends, the open end being suitable for receiving the protrusion. The slot forks into first and second portions of the slot to allow the protrusion to be selectively engaged with the first portion or the second portion, the first portion terminating in the first terminal end and the second portion terminating in the second terminal end. The body is rotatably engageable with the base about a rotation axis and the slot forks into the first and second portions at a fork of the slot, the first and second portions extending smoothly from the fork of the slot away from each other at an obtuse angle around the rotation axis to facilitate engagement of the protrusion with the first and second portions. The slot extends at least partially around the rotation axis and rises parallel to the rotation axis towards the first and second terminal ends. The slot is elongated between an open end suitable for receiving the protrusion and the first and second terminal ends, the first portion is at least partially ramped to allow ramping of the protrusion from the open end to the first terminal end, and the second portion is at least partially ramped to allow ramping of the protrusion from the open end to the second terminal end. The body is rotatably engageable with the base about a rotation axis, the first portion extends at least partially arcuately away from the open end towards the first terminal end so as to allow the protrusion to smoothly rise, parallel to the rotation axis, through the slot towards the first terminal end, the second portion extends at least partially arcuately away from the open end towards the second terminal end so as to allow the protrusion to smoothly rise, parallel to the rotation axis, through the slot towards the second terminal end. The body is rotatably engageable with the base about a rotation axis, the slot is a first slot, the protrusion is a first protrusion, and the base is rotationally engageable with the substrate by a second protrusion slidably engageable with a second slot complementary to the second protrusion, the first and second slot spaced apart from each other around the rotation axis. Each of the first and second slots extend at least partially arcuately less than 180° around the rotation axis. The slot is tapered to facilitate release of debris from the slot when the protrusion is engaged with the slot. The base is rotatably engageable with the substrate and the cap is rotatably engageable with the base along a common axis of rotation. The substrate is part of a membrane of an inflatable structure, the base being suitable for introducing gas into the inflatable structure for inflation thereof.

In an aspect, the disclosure describes a cap for a valve assembly suitable for mounting on a substrate. The cap also includes a body defining a slot formed therein that extends at least partially around a rotation axis to allow rotational engagement of the slot with a protrusion formed on a base of the valve assembly, the slot forking into first and second portions terminating in opposing first and second terminal ends to allow selectively engagement of the protrusion with the first portion or the second portion for abutment of the protrusion with the first terminal end or the second terminal end such that torque applied to the cap is transmitted to the base at the first and second terminal ends.

Implementations may include one or more of the following features. The cap wherein the slot is elongated between an open end and the first and second terminal ends, the open end being suitable for receiving the protrusion. The slot extends at least partially around the rotation axis and rises parallel to the rotation axis towards the first and second terminal ends. The first portion is at least partially ramped to allow ramping of the protrusion from the open end to the first terminal end, and the second portion is at least partially ramped to allow ramping of the protrusion from the open end to the second terminal end. The first portion extends at least partially arcuately from the open end to the first terminal end so as to allow the protrusion to smoothly rise, parallel to the rotation axis, through the slot towards the first terminal end, the second portion extends at least partially arcuately from the open end to the second terminal end so as to allow the protrusion to smoothly rise, parallel to the rotation axis, through the slot towards the first terminal end. The slot is tapered to facilitate release of debris from the slot when the protrusion is engaged with the slot. The slot is formed in an internal periphery of the cap that is complementary to an outer periphery of the base.

Implementations of the disclosure may include a cap, a base, a valve assembly, and/or an inflatable device.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1A is side elevation view of components of a valve assembly as they are brought together to be mounted on a substrate, in accordance with an embodiment;

FIG. 1B is a cross-sectional view along the cutting-plane indicated by line 1B-1B in FIG. 1A, in accordance with an embodiment;

FIG. 4A is a planar projection of an internal periphery of a cap showing two slots formed therein, in accordance with an embodiment;

FIG. 4B is a planar projection of the internal periphery of the cap showing engagement of protrusions of a base with first portions of the slots, in accordance with an embodiment; and FIG. 4C is a planar projection of the internal periphery of the cap showing engagement of the protrusions with second portions of the slots, in accordance with an embodiment.

DETAILED DESCRIPTION

Figure 2B:
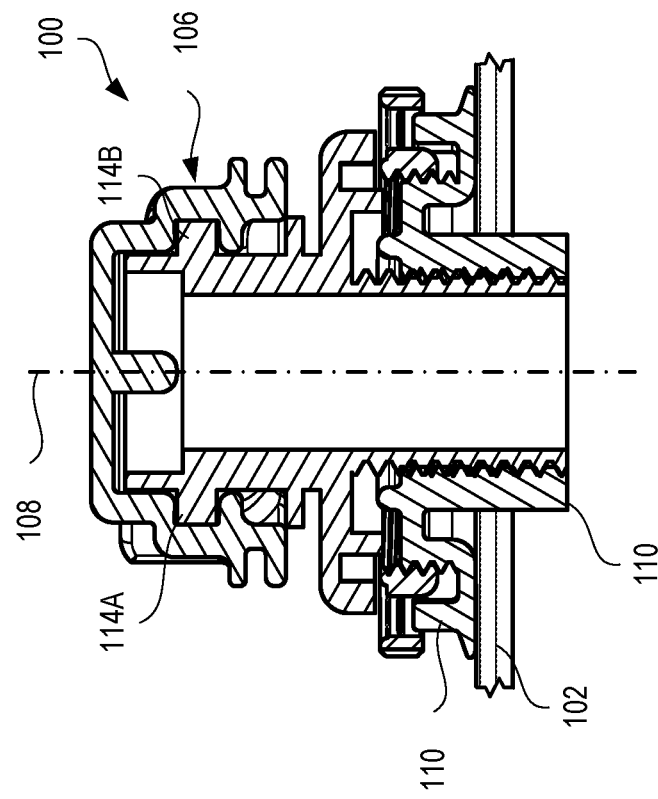
FIG. 2B is a cross-sectional view, along a cutting plane parallel to the rotational axis, of the valve assembly of FIG. 2A engaged with a substrate, in accordance with an embodiment.

The following disclosure relates to caps for valves that have a base rotatably engageable with a substrate that the valve is mounted upon. In some embodiments, the devices and assemblies disclosed herein can facilitate more convenient removal and installation of valves onto inflatables, or other structures suitable for receiving such valves.

In some embodiments, a valve cap is described which uses a normal thread for clockwise (or anticlockwise) rotation locking the valve cap on a valve base, and which also has reverse threads for anticlockwise (or, respectively, clockwise) rotation locking. At a locking movement, rotation of the cap relative to the base in one rotational direction is stopped. Such a cap can be used to tighten the valve into the valve base, then rotated 180°, such that it can be used to remove (by rotational disengagement) the valve base from the substrate.

An issue that presents itself here however is that when the bladder is pressurized, the valve body becomes difficult to unthread. This issue is compounded by the fact that these valves generally aim to be as low profile as possible, making it difficult for a user to grip the valve.

Aspects of various embodiments are described in relation to the figures.

FIG. 1A is side elevation view of components of a valve assembly 100 as they are brought together to be mounted on a substrate 102, in accordance with an embodiment.

FIG. 1B is a cross-sectional view along the cutting-plane indicated by line 1B-1B in FIG. 1A, in accordance with an embodiment.

Referring to FIGS. 1A-1B, the valve assembly 100 generally comprises a base 104 and a cap 106 that are rotatably engageable with each other about an axis of rotation, or rotation axis 108. The base 104 is rotatably engageable with the substrate 102 also about the rotation axis 108. Such engagements and rotations cause movement of the cap 106 and the base 104, relative to the substrate 102, along the rotation axis 108, as indicated by the two-headed arrows in FIGS. 1A-1B. Generally, unless provided for otherwise, two-headed arrows in the drawings here are to be understood as indicating motion and directions therefor.

In various embodiments, the substrate 102 may be a membrane of an inflatable device, such as a membrane defining a body of a water toy or an apparatus used in water sports, e.g. an inflatable boat (or other flotation device), or a wing used for wingsurfing. The base 104 may be engaged with a channel that extends through the substrate in an opening formed in the substrate to allow fluid communication across the substrate 102 via the opening. In various embodiments, the base 104 may comprise a port for receiving a fluid (e.g. air) across the substrate 102. For example, in some embodiments, the base 104 may include an open channel or one-way valve suitable for receiving gas across the substrate 102 into an inflatable vessel for inflation thereof.

In some embodiments, the base 104 may be threadably engaged with the substrate 102. The base 104 may comprise threads at one end thereof that are complementary to threads formed in the substrate 102, e.g. in a threaded channel thereof. Threads formed in the substrate 102 may be formed in a structure, referred to herein as a coupler 110, that is integrally coupled to the substrate to allow coupling of the base 104 and the substrate 102 to each other. The coupler 110 may be integrally coupled to the substrate 102 by being fused or fastened to the substrate 102.

It is understood that, in some embodiments, the base 104 may be engaged with the substrate 102, by engagement of a protuberance with an elongated recession or channel complementary to the protuberance, without necessarily having threadable engagement. For example, unlike threading, a protuberance may not be helical or circular, and the elongated recession or channel may be a slit or a groove that is dimensionally compatible with the protuberance to allow sliding of one in the other. Such arrangements may further be configured to secure the protuberance within the recession or channel, e.g. securably fixed in place.

It is understood that, in some cases, the coupler 110 may not be necessary. For example, in some embodiments, the base 104 may be rotatably engaged with a relatively rigid portion of the substrate 102, without the coupler 110.

As shown in FIGS. 1A-1B, the cap 106 is rotatably engageable with the base 104 via a body 112 of the cap 106. The body 112 is rotatably engageable with the base 104 between opposing first and second terminal ends, e.g. rotatably slidable between the first terminal end and the second terminal end. In various embodiments, the first and second terminal ends are spaced apart from each other around the rotation axis 108 to allow rotation between the first and second terminal ends, and to prevent rotation beyond the first and second terminal ends. The body 112 and the base 104 abut each other at each of the first and second terminal ends so as to prevent rotation between the body 112 and the base 104.

As referred to herein, in various embodiments, the first and second terminal ends may refer to ends of the base 104 and/or the cap 106. For example, in the embodiment of FIGS. 1A-1B, the first and second terminal ends may refer to ends of the cap 106 that abut the base 104 when the cap 106 is fully rotated (to the extent possible) in respective opposing senses of rotation. The first and second terminals ends may be at least partially specified by the relative angular position of the cap 106. In particular, the distance between the first and second terminal ends may be specified via the angular sweep of the cap 106, relative to the base 104 (or the base 104 relative to the cap 106), between the first and second terminal ends. In various embodiments, a (relative) half-turn or quarter-turn of the cap 106, i.e. a respective 180° or 90° turn of the cap 106, may specify this angular sweep.

When torque is applied to the cap 106 to urge rotation beyond the first terminal end or the second terminal ends, the abutment of the cap 106 and the base 104 against each other, at the first and second terminal ends, causes such torque to be transmitted to the base 104. Since the base 104 is rotatably engaged with the substrate 102, the transmitted torque may then advantageously vary rotational engagement of the base 104 with the substrate 102. Applying torque at one of the first or second terminal ends (oriented to urge rotation beyond the corresponding terminal end) may cause rotational engagement (tightening) of the base 104 with the substrate 102, while application of similar torque at the other one of the first or second terminal ends may cause rotational disengagement (loosening) of the base 104 with the substrate 102.

In the embodiment of FIGS. 1A-1B, the base 104 has two protrusions 114A, 114B extending radially outwardly from a body of the base 104 that is received within the cap 106. The protrusions 114A, 114B are configured to couple to corresponding slots 116A, 116B formed in the body 112 of the cap 106. The slot 116B can be seen partially in the cross-section of FIG. 1B. The presence of slot 116A is indicated in FIG. 1A and referenced by an outer mold of the slot 116A formed in the body 112. As will be discussed later, the slots 116A, 116B may be configured to receive, via respective open ends thereof, the protrusions 114A, 114B to allow slidable engagement of the protrusions 114A, 114B with the slots 116A, 116B as the cap 106 and the base 104 are rotatably engaged with each other.

In various embodiments, the slots 116A, 116B may be formed in a, at least partially circular, periphery or circumferential end of the cap 106. In some embodiments, the slots 116A, 116B may formed in an internal, at least partially circular, periphery 118 of the cap 106. Such an internal periphery 118 may be dimensioned based on an outer periphery 120 of the base 104. The internal periphery 118, adapted, and/or complementary to an outer periphery of the base 104 that receives the cap 106 (i.e. the internal periphery 11s8 thereof). In some embodiments, the slots 116A, 116B may be formed in an external periphery of the cap 106.

In the embodiment of FIGS. 1A-1B, each slot 116A, 116B is forked such that each slot 116A, 116B defines a corresponding pair of opposed closed ends that are spaced apart from each other. The first and second terminal ends may be defined by one pair of the two pairs of closed ends such that, at each of the first and second terminal ends, at least one of the protrusions 114A, 114B abuts a corresponding one closed end of the one pair of closed ends referenced above. It is understood that, in some cases, both protrusions 114A, 114B may advantageously abut a corresponding closed end when the cap 106 and the base 104 are fully rotatably engaged with each other.

In various embodiments, the protrusions 114A, 114B may be akin to lugs in structure. The protrusions 114A, 114B may be opposite to each other, or on opposite sides of the base 104. For example, the protrusions 114A, 114B may be positioned antipodally about a cylindrical body or portion of the base 104. For example, the protrusions 114A, 114B may be cylindrical in shape with a longitudinal axis thereof extending radially outwardly from the rotation axis 108 and the cylindrical shape being sized to have generally have a 1:1 aspect ratio. The protrusions 114A, 114B may not be elongated in the circumferential direction around the rotation axis 108 so as to allow flexible coupling with the slots 116A, 116B.

As shown in FIGS. 1A-1B, the slots 116A, 116B extend at least partially around the rotation axis 108. Additionally, the slots 116A, 116B rise parallel to the rotation axis 108 from respective open ends thereof to the first and second terminal ends. The slots 116A, 116B may extend arcuately or circularly around the rotation axis 108. The slots 116A, 116B may be spaced apart from each other about the rotation axis 108. In various embodiments, each of the slots 116A, 116B extends at least partially arcuately less than 360° around the rotation axis 108. In some embodiments, each of the slots 116A, 116B extends less than 180° around the rotation axis 108.

As can be seen in FIG. 1B, the slot 116B is tapered to facilitate release of debris, such as sand (to provide sand relief) or other particulate matter, therefrom when the protrusion 114A is engaged therewith. The slot 116A may be similarly tapered for such purposes. The slots 116A, 116B may be tapered to create space between the slots 116A, 116B and the respective protrusions 114A, 114B to allow movement of material in the space or cavity formed. In various embodiments, tapering of the slots 116A, 116B is in a direction normal to a sliding direction of the protrusion 114A, 114B in the respective slots 116A, 116B. For example, the slots 116A, 116B may be deeper than needed to allow sliding of the respective protrusions 114A, 114B therein.

While FIGS. 1A-1B show coincidence of respective axes of rotational engagement of the base 104 with the cap 106 and the base 104 with the substrate 102, it is understood that these axes may be offset relative to each other as long as an advantageous effect of transmission of torque, applied to the cap 106, to the base 104 to vary rotational engagement of the base 104 with the substrate 102 is achieved. In some embodiments, coincident axes of rotation may be particularly advantageous since torque applied to the cap 106 may be substantially completely utilized for varying engagement of the base 104 with the substrate 102.

Figure 2A:
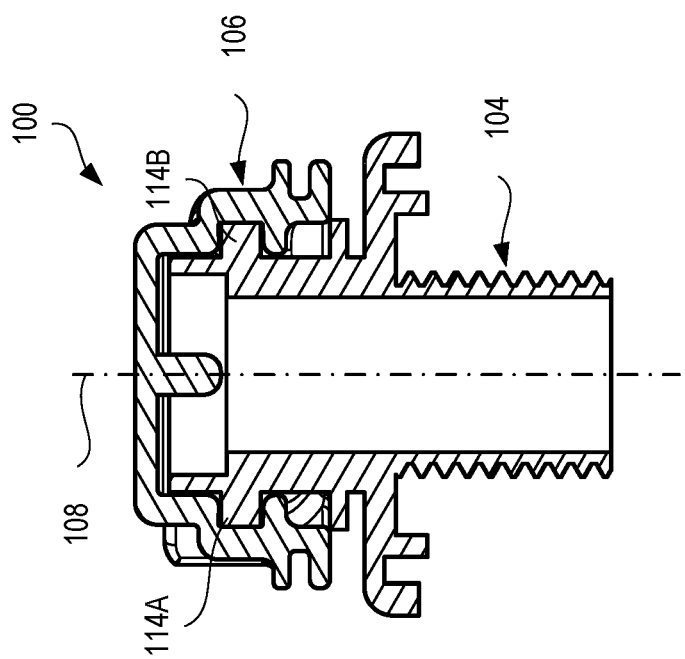
FIG. 2A is a cross-sectional view, along a cutting plane parallel to the rotational axis, of a cap of the valve assembly engaged with a base of the valve assembly, in accordance with an embodiment.

FIG. 2A is a cross-sectional view, along a cutting plane parallel to the rotational axis, of the cap engaged with the base, in accordance with an embodiment.

The protrusions 114A, 114B are shown engaged with the slots 116A, 116B. A lower end of the cap 106 may abut the base 104 and, in particular, an extension radially extending therefrom.

FIG. 2B is a cross-sectional view, along a cutting plane parallel to the rotational axis, of the valve assembly of FIG. 2A engaged with a substrate, in accordance with an embodiment.

In various embodiments, the coupler 110 in FIG. 2B extends or juts outwardly from a surrounding portion of the substrate 102, and includes a flange resting on this surrounding portion. A rotary grip (or dial) may be coupled to the coupler 110 above the flange. The rotary grip may be rotatably engaged with the coupler 110, e.g. by threadable engagement. A user may tighten the rotary grip on to the coupler 110 and thereby apply a torque on to the coupler 110. If such a torque is applied to the coupler 110 and the valve assembly 100, in particular the base 104, is prevented from rotating, the rotational engagement between the base 104 and the coupler 110 may be either increased or decreased, depending on the sense of the two pairs of threadably fastening portions in FIG. 2B. The rotary grip may allow rotation of the coupler 110 without (needing) the valve assembly 100.

Figure 3:
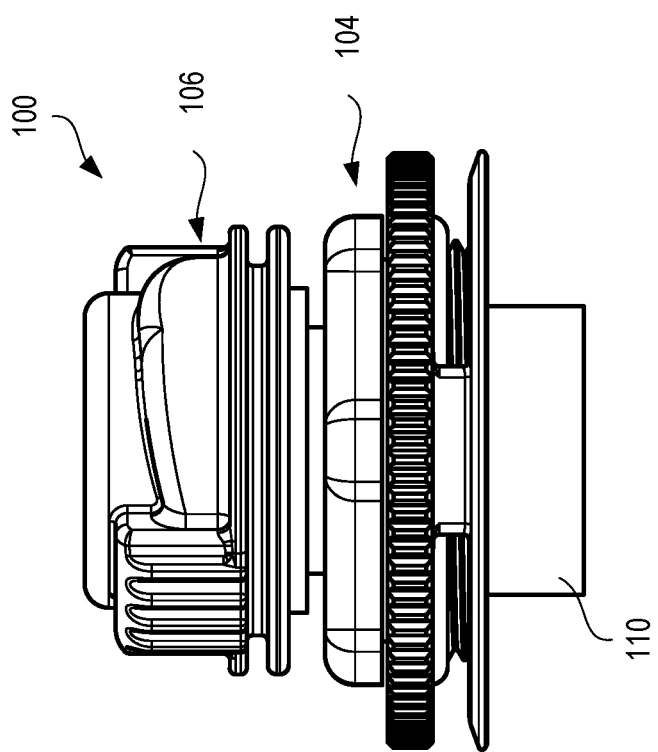
FIG. 3 is a side elevation view of a valve assembly engaged with a coupler without the rest of the substrate, in accordance with an embodiment.

FIG. 3 is a side elevation view of a valve assembly 100 engaged with a coupler 110 without the substrate, in accordance with an embodiment.

In the embodiment of FIG. 3, the coupler 110 has a low profile flange extending outwardly that would rest on a surrounding portion of the substrate 102 (not shown). The rotary grip is not engaged with the low profile flange and is spaced apart therefrom.

FIG. 4A is a planar projection of the internal periphery 118, in accordance with an embodiment.

The planar projection may be understood as unrolling the internal periphery 118 at line 4-4 in FIG. 1B.

The slots 116A, 116B are positioned spaced apart from each other on the internal periphery 118. Each of the slots 116A, 116B may extend less than an arc defined by half a turn (half the width of the planar projection in FIG. 4A), i.e. less than arc defined by 180° about the rotation axis 108. A multi-slot configuration provides greater discrete points of contact and abutment between the base 104 and the cap 106, which may be advantageous in certain circumstances. In various embodiments, the first slot 116A and the second slot 116B may be dimensioned substantially similarly and may oriented in similar or analogous directions so as to allow engagement by separate first and second protrusions. For example, such protrusions may also be dimensionally similar to each other, allow greater flexibility in how the protrusions are engaged with the slots 116A, 116B.

The slots 116A, 116B extend from respective open ends 136A, 136B and fork at respective forks 138A, 138B of the slots 116A, 116B. The forks 138A, 138B fork into first portions 122A, 122B and second portions 124A, 124B. The first portions 122A, 122B terminate in respective first terminal ends 128A, 128B. The second portions 124A, 124B terminate in respective second terminal ends 130A, 130B.

The open ends 136A, 136B are proximal to a bottom end of the cap 106 and distal from a top end thereof. The first and second terminal ends 128A, 128B, 130A, 130B are positioned between the top end and the open ends 136A, 136B, and, in some embodiments, may be proximal to the top end and distal from the bottom end of the cap 106.

The first portions 122A, 122B and the second portions 124A, 124B extend smoothly away from each other at respective obtuse angles 126A, 126B around the rotation axis 108 to facilitate engagement of the protrusion with the first portions 122A, 122B and the second portions 124A, 124B.

The first portions 122A, 122B are at least partially ramped to allow ramping of the protrusions 114A, 114B received therein from the respective open ends 136A, 136B to the respective first terminal ends 128A, 128B. Similarly, the second portions 124A, 124B are at least partially ramped to allow ramping of the protrusions 114A, 114B received therein from the respective open ends 136A, 136B to the respective second terminal ends 130A, 130B.

The ramping in the first portions 122A, 122B and the second portions 124A, 124B may be achieved by ramping surfaces defining these portions and which are suitable for engaging or contacting the protrusions 114A, 114B. For example, the first portions 122A, 122B (and/or the second portions 124A, 124B) may extend at least partially arcuately away from the respective open ends 136A, 136B towards the first terminal ends 128A, 128B (and/or the second terminal ends 130A, 130B) parallel to the rotation axis 108 so as to allow the protrusions 114A, 114B to smoothly rise through the slots 116A, 116B towards the first terminal ends (and/or the second terminal ends 130A, 130B).

As described herein, the shape of a slot may refer to the shape of a portion of the slot that is engaged by a corresponding protrusion. Slots may be regions where there is relatively lesser material. For example, slots may be grooves or recessed portions. In some embodiments, slots may be slits or elongated openings.

FIG. 4B is a planar projection of the internal periphery 118 of FIG. 4A showing engagement of the protrusions 114A, 114B with the first portions 122A, 122B, in accordance with an embodiment.

The protrusions 114A, 114B are engaged with the first portions 122A, 122B by clockwise movement 132 of the interior periphery 118. Such clockwise movement 132 causes sliding 134A, 134B of the protrusions 114A, 114B into the first portions 122A, 122B from the open ends 136A, 136B to the first terminal ends 128A, 128B.

FIG. 4C is a planar projection of the internal periphery 118 of FIG. 4A showing engagement of the protrusions 114A, 114B with the second portions 124A, 124B in accordance with an embodiment.

The protrusions 114A, 114B are engaged with the second portions 124A, 124B by anticlockwise movement 132' of the interior periphery 118. Such anticlockwise movement 132' causes sliding 140A, 140B of the protrusions 114A, 114B into the second portions 124A, 124B from the open ends 136A, 136B to the second terminal ends 130A, 130B.

The sliding movements 132, 132' illustrate ramping of the protrusions 114A, 114B into the slots 116A, 116B.

The protrusions 114A, 114B may be selectively slide into, and slidably engage with, either first portions 122A, 122B or the second portions 124A, 124B by a user by applying an appropriate (clockwise or anticlockwise) torque to the cap 106 as it is pushed on to the protrusions 114A, 114B via the open ends 136A, 136B.

The slots 116A, 116B and protrusions 114A, 114B (respectively) are complementary to each other to allow sliding of one in the other. The protrusions 114A, 114B translate along elongations (or elongation directions) of the slot 116A, 116B. As referring to herein, elongation may refer to the elongation of the first and/or second portions.

In some embodiments: the cap may be generally cylindrical shaped with a diameter between 10 mm and 100 mm; a distance, along an internal periphery, between first and second terminal ends of a slot is between 17 mm and 170 mm; a length of a first portion, as travelled by a protrusion, is between 12 mm and 120 mm; a length of a second portion, as travelled by a protrusion, is between 5 mm and 50 mm, or less than or about half of the first portion, as travelled by the protrusion; a vertical rise, parallel to the rotation axis 108, from an open end to the first terminal end is between 4.5 mm and 45 mm; a vertical rise, parallel to the rotation axis 108, from an open end to the second terminal end is between 3 mm and 30 mm, or less than a vertical rise, parallel to the rotation axis 108, from an open end to the first terminal end; a diameter of the protrusion may be between 2 mm and 20 mm; and/or a width of an open end of a slot may be between 9 mm and 90 mm.

In various embodiments; the valve assembly may be manufactured using injection molding, machining, 3D printing, and/or other additive or subtractive methods of manufacturing.

As can be understood, the examples described above and illustrated are intended to be exemplary only. The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in various embodiments, a slot may be a groove or an elongated aperture; a slot may be formed on an external circumference or periphery; a slot can be formed on a valve base and may be complementary to a protrusion formed on the cap; first and second terminal ends may be terminals ends of a protrusion formed either on the base or the cap; one or three or more protrusions may be provided, with corresponding one or three or more slots; multiple protrusions may be engageable with a single slot; the slot may be deeper than a corresponding depth of the protrusion to allow space between a radially deeper end of the slot and a radially outer end of the protrusion; the first and second portions may be parallel and extending opposite to each other; the first and second portions may meet at a T-shaped junction; and/or a valve assembly may suitable for non-inflatable devices. Yet further modifications could be implemented by a person of ordinary skill in the art in view of the present disclosure, which modifications would be within the scope of the present technology.

What is claimed is:

1. A valve assembly for mounting on a substrate, comprising:
    a base rotatably engageable with the substrate; and
    a cap defining a body that is rotatably engageable with the base between opposing first and second terminal ends, the body and the base abutting each other, at each of the first and second terminal ends, so as to prevent rotation between the body and the base to allow torque applied to the cap to be transmitted to the base via a protrusion to vary rotational engagement of the base with the substrate, the protrusion being slidably engageable with a slot complementary to the protrusion for translation of the protrusion along an elongation of the slot, the slot being elongated between an open end and the first and second terminal ends, the open end being suitable for receiving the protrusion.

2. The valve assembly of claim 1, wherein the slot forks into first and second portions of the slot to allow the protrusion to be selectively engaged with the first portion or the second portion, the first portion terminating in the first terminal end and the second portion terminating in the second terminal end.

3. The valve assembly of claim 2, wherein the slot is elongated between an open end suitable for receiving the protrusion and the first and second terminal ends, the first portion is at least partially ramped to allow ramping of the protrusion from the open end to the first terminal end, and the second portion is at least partially ramped to allow ramping of the protrusion from the open end to the second terminal end.

4. The valve assembly of claim 3, wherein the body is rotatably engageable with the base about a rotation axis, the first portion extends at least partially arcuately away from the open end towards the first terminal end so as to allow the protrusion to smoothly rise, parallel to the rotation axis, through the slot towards the first terminal end, the second portion extends at least partially arcuately away from the open end towards the second terminal end so as to allow the protrusion to smoothly rise, parallel to the rotation axis, through the slot towards the second terminal end.

5. The valve assembly of claim 2, wherein the body is rotatably engageable with the base about a rotation axis and the slot forks into the first and second portions at a fork of the slot, the first and second portions extending smoothly from the fork of the slot away from each other at an obtuse angle around the rotation axis to facilitate engagement of the protrusion with the first and second portions.

6. The valve assembly of claim 5, wherein the slot extends at least partially around the rotation axis and rises parallel to the rotation axis towards the first and second terminal ends.

7. The valve assembly of claim 1, wherein the body is rotatably engageable with the base about a rotation axis, the slot is a first slot, the protrusion is a first protrusion, and the base is rotationally engageable with the substrate by the torque applied to the cap being transmitted to the base via the first protrusion and a second protrusion, the second protrusion being slidably engageable with a second slot complementary to the second protrusion, the first and second slot being spaced apart from each other around the rotation axis.

8. The valve assembly of claim 7, wherein each of the first and second slots extend at least partially arcuately less than 180° around the rotation axis.

9. The valve assembly of claim 1, wherein the slot is tapered to facilitate release of debris from the slot when the protrusion is engaged with the slot.

10. The valve assembly of claim 1, wherein the base is rotatably engageable with the substrate and the cap is rotatably engageable with the base along a common axis of rotation.

11. The valve assembly of claim 1, wherein the substrate is part of a membrane of an inflatable structure, the base being suitable for introducing gas into the inflatable structure for inflation thereof.

12. A cap for a valve assembly suitable for mounting on a substrate, comprising:

a body defining a slot formed therein that extends at least partially around a rotation axis to allow rotational engagement of the slot with a protrusion formed on a base of the valve assembly, the slot forking into first and second portions terminating in opposing first and second terminal ends to allow selectively engagement of the protrusion with the first portion or the second portion for abutment of the protrusion with the first terminal end or the second terminal end such that torque applied to the cap is transmitted to the base at the first and second terminal ends.

13. The cap of claim 12, wherein the slot is elongated between an open end and the first and second terminal ends, the open end being suitable for receiving the protrusion.

14. The cap of claim 13, wherein the slot extends at least partially around the rotation axis and rises parallel to the rotation axis towards the first and second terminal ends.

15. The cap of claim 13, wherein the first portion is at least partially ramped to allow ramping of the protrusion from the open end to the first terminals end, and the second portion is at least partially ramped to allow ramping of the protrusion from the open end to the second terminal end.

16. The cap of claim 13, wherein the first portion extends at least partially arcuately from the open end to the first terminal end so as to allow the protrusion to smoothly rise, parallel to the rotation axis, through the slot towards the first terminal end, the second portion extends at least partially arcuately from the open end to the second terminal end so as to allow the protrusion to smoothly rise, parallel to the rotation axis, through the slot towards the second terminal end.

17. The cap of claim 12, wherein the slot is tapered to facilitate release of debris from the slot when the protrusion is engaged with the slot.

18. The cap of claim 12, wherein the slot is formed in an internal periphery of the cap that is complementary to an outer periphery of the base.

* * * * *